(12) United States Patent
Schlenoff (10) Patent No.: US 7,261,771 B2
(45) Date of Patent: Aug. 28, 2007

(54) METHOD OF CONTROLLING THE VISCOSITY OF A CEMENTITIOUS MIXTURE USING OPPOSITELY-CHARGED POLYELECTROLYTES

(75) Inventor: Joseph B. Schlenoff, Tallahassee, FL (US)

(73) Assignee: nanoStrata Inc., Tallahassee, FL (US)

( * ) Notice: Subject to any disclaimer, the term of this patent is extended or adjusted under 35 U.S.C. 154(b) by 444 days.

(21) Appl. No.: 10/250,412

(22) PCT Filed: Jan. 9, 2002

(86) PCT No.: PCT/US02/00585

§ 371 (c)(1),
(2), (4) Date: Jul. 1, 2003

(87) PCT Pub. No.: WO02/066393

PCT Pub. Date: Aug. 29, 2002

(65) Prior Publication Data

US 2004/0060481 A1    Apr. 1, 2004

(51) Int. Cl.
*C04B 24/24* (2006.01)
(52) U.S. Cl. ............ 106/696; 106/724; 106/725; 106/727; 106/823; 524/5
(58) Field of Classification Search ............ 106/724, 106/696, 725, 727, 823; 524/5
See application file for complete search history.

(56) References Cited

U.S. PATENT DOCUMENTS

| | | | |
|---|---|---|---|
| 3,965,032 A | | 6/1976 | Gibbs |
| 3,985,610 A | * | 10/1976 | Pomerhn et al. ............ 162/133 |
| 4,021,257 A | * | 5/1977 | Bernett ............ 524/6 |
| 4,086,200 A | | 4/1978 | Lamoria |
| 4,086,201 A | | 4/1978 | Peters et al. |
| 4,137,088 A | | 1/1979 | Debus et al. |
| 4,306,912 A | | 12/1981 | Forss |
| 4,501,834 A | | 2/1985 | Su |
| 4,970,260 A | | 11/1990 | Lundberg et al. |
| 5,112,603 A | * | 5/1992 | Nadolsky et al. ......... 514/772.3 |
| 5,389,144 A | * | 2/1995 | Burge et al. ............ 106/737 |
| 5,674,316 A | * | 10/1997 | Izumi et al. ............ 106/724 |
| 5,720,807 A | * | 2/1998 | Izumi et al. ............ 106/696 |
| 5,904,764 A | | 5/1999 | Verhille |
| 6,281,172 B1 | * | 8/2001 | Warren et al. ............ 507/110 |
| 6,719,834 B1 | * | 4/2004 | Braun et al. ............ 106/35 |

FOREIGN PATENT DOCUMENTS

| | | |
|---|---|---|
| EP | 0362770 A3 | 4/1990 |
| EP | 0709354 A1 | 5/1996 |
| FR | 2599663 A1 | 12/1987 |
| GB | 2251254 A | 7/1992 |
| JP | 49104874 * | 10/1974 |
| JP | 63103849 * | 5/1988 |
| JP | 10328700 * | 12/1998 |
| WO | WO97/19711 A1 | 5/1997 |

OTHER PUBLICATIONS

Hawley's Condensed Chemical Dictionary 893 14th ed. 2001.*
Ohama, Y., "Handbook of Polymer-Modified Concrete and Mortars, Properties and Process Technology," Building Materials Science Series, College of Engineering, Nihon University, Koriyama, Japan, Aug. 1994, Chapters 1, 2 and 6-9.
PCT International Search Report, PCT/US02/00585, Aug. 9, 2002, 6 pages.

* cited by examiner

*Primary Examiner*—Paul Marcantoni
(74) *Attorney, Agent, or Firm*—Senniger Powers (57) ABSTRACT

A process for increasing the viscosity of an aqueous cementitious mixture during its working state by mixing oppositely-charge polyelectrolytes into the cementitious mixture.

41 Claims, 10 Drawing Sheets

FIG. 1

Table A

| ASTM Type | Characteristics | $C_3S^a$ wt% | $C_2S$ wt% | $C_3A$ wt% | $C_4AF$ wt% | Remainder[b] |
|---|---|---|---|---|---|---|
| I | Standard | 45 | 27 | 11 | 8 | 9 |
| II | Reduced heat of hydration and increased sulfate resistance | 44 | 31 | 5 | 13 | 7 |
| III | High early strength (coupled with high heat of hydration) | 53 | 19 | 11 | 9 | 8 |
| IV | Low heat of hydration (lower than II and especially good for massive structures) | 28 | 49 | 4 | 12 | 7 |
| V | Sulfate resistance (better than II and especially good for marine structures | 38 | 43 | 4 | 9 | 6 |

[a] A shorthand notation is used in cement technology: $C_3S = 3CaO \cdot SiO_2$, $C_2S = 2CaO \cdot SiO_2$, $C_3A = 3CaO \cdot Al_2O_3$, $C_4AF = 4CaO \cdot Al_2O_3 \cdot Fe_2O_3$.

[b] Primarily simple oxides such as $MgO$, $CaO$, alkali oxides and $CaSO_4$.

FIG. 2

Table B

| Type | Characteristics | Example |
|---|---|---|
| Accelerators | Give early strength and curing | $CaCl_2$ |
| Air entrainers | Reduce air-water interfacial tension to give entrapped air bubbles and resulting workability and freeze-thaw durability | sodium lauryl sulfate |
| Bonding admixtures | Bond fresh to hardened concrete | Fine iron particles plus chloride |
| Coloring agents | Provide surface colors | Inorganic pigments |
| Expansion admixtures | Reduce shrinkage due to rust formation | Fine iron particles plus chloride |
| Gas formers | React with hydroxides to produce $H_2$ bubbles and resulting cellular structure | Aluminum powder |
| Pozzolans | Silica reacts with free CaO to produce additional $C_2S$ hydrate and resulting reduction in heat of hydration | Volcanic ash |
| Retarders | Retard curing and prevent bonding between hardened and fresh concrete | Lignosulfonate salts |
| Surface hardeners | Produce abrasion-resistant surface | Fused alumina particles |
| Water reducers | Releases water trapped in lumps of cement thereby increasing the workability | Lignosulfonate salts |
| Plasticizers | make the cement easier to pump and flow | Bentonite clay |

FIG. 3

------- NEGATIVE POLYMER

———— POSITIVE POLYMER

Table C

PDAD/PSS at about 1:2 ratio

| First Added Polymer 20 wt% PDAD (mL) | Second Added Polymer 20 wt% PSS (mL) | Total Added Polymer (mL) | Weight % Total Added Polymer | Relative Viscosity |
|---|---|---|---|---|
| 0.1 | 0.2 | 0.3 | 0.008 | 1.9 |
| 0.2 | 0.4 | 0.6 | 0.016 | 2.5 |
| 0.4 | 0.8 | 1.2 | 0.032 | 3.7 |
| 0.5 | 1.0 | 1.5 | 0.04 | 4.8 |
| 0.7 | 1.4 | 2.1 | 0.56 | 6.9 |
| 1.0 | 2.0 | 3.0 | 0.08 | 7.3 |
| 2.0 | 4.0 | 6.0 | 0.16 | 15.5 |

Table D

PSS/PDAD at about 2:1 ratio

| First Added Polymer 20 wt% PSS (mL) | Second Added Polymer 20 wt% PDAD (mL) | Total Added Polymer (mL) | Weight % Total Added Polymer | Relative Viscosity |
|---|---|---|---|---|
| 0.2 | 0.1 | 0.3 | 0.008 | 2.0 |
| 0.4 | 0.2 | 0.6 | 0.016 | 3.2 |
| 1.0 | 0.5 | 1.5 | 0.04 | 4.4 |
| 2.0 | 1.0 | 3.0 | 0.08 | 10.3 |
| 3.0 | 1.5 | 4.5 | 0.12 | 12 |

FIG. 6

Table E

PSS/PVBTA at about 1:1 ratio

| First Added Polymer 20 wt% PSS (mL) | Second Added Polymer 30 wt% PVBTA (mL) | Total Added Polymer (mL) | Weight % Total Added Polymer | Relative Viscosity |
|---|---|---|---|---|
| 0.1 | 0.08 | 0.18 | 0.006 | 2.7 |
| 1.0 | 0.8 | 1.8 | 0.06 | 8.2 |
| 2.0 | 1.6 | 3.6 | 0.12 | 8.3 |
| 3.0 | 2.4 | 5.4 | 0.18 | 8.2 |
| 4.0 | 3.2 | 7.2 | 0.23 | 9 |

Table F

PSS/PVBTA at about 2:1 ratio

| First Added Polymer 20 wt% PSS (mL) | Second Added Polymer 30 wt% PVBTA (mL) | Total Added Polymer (mL) | Weight % Total Added Polymer | Relative Viscosity |
|---|---|---|---|---|
| 0.2 | 0.06 | 0.28 | 0.008 | 3.9 |
| 2.0 | 0.6 | 2.8 | 0.08 | 13.3 |
| 3.0 | 1.0 | 4.6 | 0.12 | 22.3 |

FIG. 7

Table G

PDAD/PAMPS at about 1:1 ratio

| First Added Polymer 5 wt% PDAD (mL) | Second Added Polymer 5 wt% PAMPS (mL) | Total Added Polymer (mL) | Weight % Total Added Polymer | Relative Viscosity |
|---|---|---|---|---|
| 0.1 | 0.13 | 0.23 | 0.0015 | 4.3 |
| 1.0 | 1.3 | 2.3 | 0.015 | 7.0 |
| 1.5 | 2.0 | 3.5 | 0.023 | 10.4 |
| 2.0 | 2.6 | 4.6 | 0.031 | 12.4 |
| 3.0 | 4.0 | 7.0 | 0.047 | 15.2 |
| 4.0 | 5.2 | 9.2 | 0.061 | 17.0 |

Table H

PDAD/PAMPS at about 1:2 ratio

| First Added Polymer 5 wt% PDAD (mL) | Second Added Polymer 5 wt% PAMPS (mL) | Total Added Polymer (mL) | Weight % Total Added Polymer | Relative Viscosity |
|---|---|---|---|---|
| 0.5 | 1.3 | 1.8 | 0.012 | 7.9 |
| 1.0 | 2.6 | 3.6 | 0.024 | 10.7 |
| 1.5 | 4.0 | 5.5 | 0.037 | 15.6 |

FIG. 8

Table I

PSS/PDAD-co-PAC at about 1:1 ratio

| First Added Polymer 5 wt% PSS (mL) | Second Added Polymer 5 wt% PDAD-co-PAC[c] (mL) | Total Added Polymer (mL) | Weight % Total Added Polymer | Relative Viscosity |
|---|---|---|---|---|
| 0.4 | 0.4 | 0.8 | 0.005 | 10.0 |
| 1.0 | 1.0 | 2.0 | 0.013 | 11.3 |
| 2.0 | 2.0 | 4.0 | 0.026 | 22.0 |

[c] 45 weight percent PDAD units and 55 weight percent PAC units. The PAC units do not have a charge (i.e., neutral) so the average charge per repeat unit less than 1, specifically, about 0.25.

Table J

PSS/PDAD-co-PAC at about 1:2 ratio

| First Added Polymer 5 wt% PSS (mL) | Second Added Polymer 5 wt% PDAD-co-PAC[d] (mL) | Total Added Polymer (mL) | Weight % Total Added Polymer | Relative Viscosity |
|---|---|---|---|---|
| 0.5 | 1.0 | 1.5 | 0.01 | 12.9 |
| 1.0 | 2.0 | 3.0 | 0.02 | 18.0 |

[d] 45 weight percent PDAD units and 55 weight percent PAC units. The PAC units do not have a charge (i.e., neutral) so the average charge per repeat unit less than 1, specifically, about 0.25.

FIG. 9

Table K

PSS/PEI at about 1:1 ratio

| First Added Polymer 20 wt% PSS (mL) | Second Added Polymer 50 wt% PEI (mL) | Total Added Polymer (mL) | Weight % Total Added Polymer | Relative Viscosity |
|---|---|---|---|---|
| 0.1 | 0.5 | 1.5 | 0.006 | 0.9 |
| 0.5 | 2.5 | 3.0 | 0.03 | 0.8 |
| 2 | 0.8 (50 w%) | 2.8 | 0.11 | 1.0 |
| 4 | 1.6 | 20 | 1.2 | 0.6 |

Table L

PSS/PEI at about 1:20 ratio

| First Added Polymer Solution 20 wt% PSS (mL) | Second Added Polymer Solution 50 wt% PEI (mL) | Total Added Polymer Solution (mL) | Weight % Total Added Polymer | Relative Viscosity |
|---|---|---|---|---|
| 0.1 | 0.8 | 0.9 | 0.056 | 1.0 |
| 1.0 | 8.0 | 9.0 | 0.56 | 0.8 |
| 4 | 32 | 36 | 2.5 | 0.7 |

Table M

PAA/PDAD at about 2:1 ratio

| First Added Polymer 25 wt% PAA (mL) | Second Added Polymer 20 wt% PDAD (mL) | Total Added Polymer (mL) | Weight % Total Added Polymer | Relative Viscosity |
|---|---|---|---|---|
| 2.0 | 0.6 | 2.6 | 0.083 | 0.7 |
| 1.0 | 0.8 | 1.8 | 0.55 | 0.7 |
| 4.0 | 2.0 | 6.0 | 0.19 | 0.4 |
| 0.1 | 0.08 | 0.18 | 0.005 | 0.8 |

FIG. 10

METHOD OF CONTROLLING THE VISCOSITY OF A CEMENTITIOUS MIXTURE USING OPPOSITELY-CHARGED POLYELECTROLYTES

BACKGROUND OF THE INVENTION

The present invention relates generally to a method of controlling the viscosity of a cementitious mixture which is useful in applying the cementitious mixture.

Portland cement is one of the most widely used materials in the construction industry. The term "portland cement" is typically used to describe the kind of product obtained by heating lime-clay mixtures, or natural cement rock, to such a temperature that practically the entire product is sintered followed by grinding. The product is often a mixture of dicalcium and tricalcium silicate with lesser amounts of aluminate. Various additives can be included in accordance with conventional portland cement manufacturing practices. Portland cement sets rapidly, within about 24 hours, and continues to harden slowly over a period of years.

In many instances, it may be desirable to combine a portland cement or other cement with an aggregate material (e.g., sand, stone, gravel, pebbles, granite, carborundum, marble chips, and mica). For example, conventional "concrete" is a cementitious mixture comprising portland cement, water and aggregate, such as sand or a mixture of sand with gravel. The particle sizes for the cement powders are relatively small compared to the finest aggregates (e.g., cement particles typically have a surface area of about 0.5 to about 3.5 $m^2/g$, measured by B.E.T. whereas sand grains are typically about 0.08 to about 5 mm in diameter). In conventional concrete compositions, the aggregate constitutes more than about 10 percent by weight of the cementitious mixture and usually from about 15 to about 30 percent by weight of the cementitious mixture. The cement is the matrix that, when mixed with water, hardens and bonds the aggregate particles into a rigid solid.

The viscous properties of a cementitious mixture have certain undesirable characteristics, for example, being fluid-like in their working state; cementitious mixtures tend to sag, run or slump during and immediately after application. A layer of concrete which is spread on a sloping surface tends to sag toward the lower end. Cementitious mixtures sprayed or layered onto a vertical surface (e.g. stucco) tend to sag or run if the applied layer is too thick. Cementitious mixtures applied to a ceiling, roof or overhead structure may sag or detach, even if supported on a frame, if applied too thick. The surface of cementitious materials may not faithfully retain patterns on their surface due to running before hardening. Reinforcement materials, such as steel bars, may be difficult to coat. A cementitious mixture, when sprayed, has a tendency to spatter, rebound or bounce off the surface to which it is being applied, making the application inefficient. In these aforementioned examples, it would, in many cases, be advantageous for the cementitious mixture to have a higher working viscosity.

Typically, the method of increasing viscosity is to add less water to the cementitious mixture. This option, however, significantly decreases the working time of the cement. Decreased water premix concrete, for example, could harden before delivery. There are also distinct disadvantages in the workability of concrete mixed, transported and applied entirely in a decreased water or viscosity-enhanced state. For example, pumping or spraying of viscosity-enhanced premix concrete is more difficult. Additionally, if insufficient water is added, the final mechanical properties may be adversely impacted (e.g. modulus of elasticity, tensile strength, crack resistance, wear resistance).

BRIEF SUMMARY OF THE INVENTION

Among the objects of the present invention, therefore, is the provision of a method for controlling the viscosity of a cementitious mixture without negatively affecting the working ability or final mechanical properties of the set and/or hardened cementitious mixture.

Briefly, therefore, the present invention is directed to a process for increasing the viscosity of an aqueous cementitious mixture during its working state, the process comprising mixing a polyelectrolyte comprising a positively-charged repeat unit and polyelectrolyte comprising a negatively-charged repeat unit into the cementitious mixture.

The present invention is further directed to such an aqueous cementitious mixture comprising cement, water, a polyelectrolyte comprising a negatively-charged repeat unit and a polyelectrolyte comprising a positively-charged repeat unit.

In yet another aspect of the present invention, it is directed to a set cementitious mixture comprising hydrated cement, a polyelectrolyte comprising a negatively-charged repeat unit and a polyelectrolyte comprising a positively-charged repeat unit.

Other objects and features of the present invention will be in part apparent and in part pointed out hereinafter.

DETAILED DESCRIPTION OF THE INVENTION

The present invention is directed to a method of controlling the viscosity of an aqueous cementitious mixture during its working state. In particular, the present invention is directed to a method comprising mixing a polyelectrolyte comprising negatively-charged repeat unit into the cementitious mixture and mixing a polyelectrolyte comprising a positively-charged repeat unit into the cementitious mixture. Surprisingly, the addition of polyelectrolytes comprising oppositely charged repeat units significantly increases the viscosity of the cementitious mixture without deleterious effects on the working time of the cementitious mixture or the mechanical properties of the hardened cementitious mixture.

A. Cement

Figure 1:
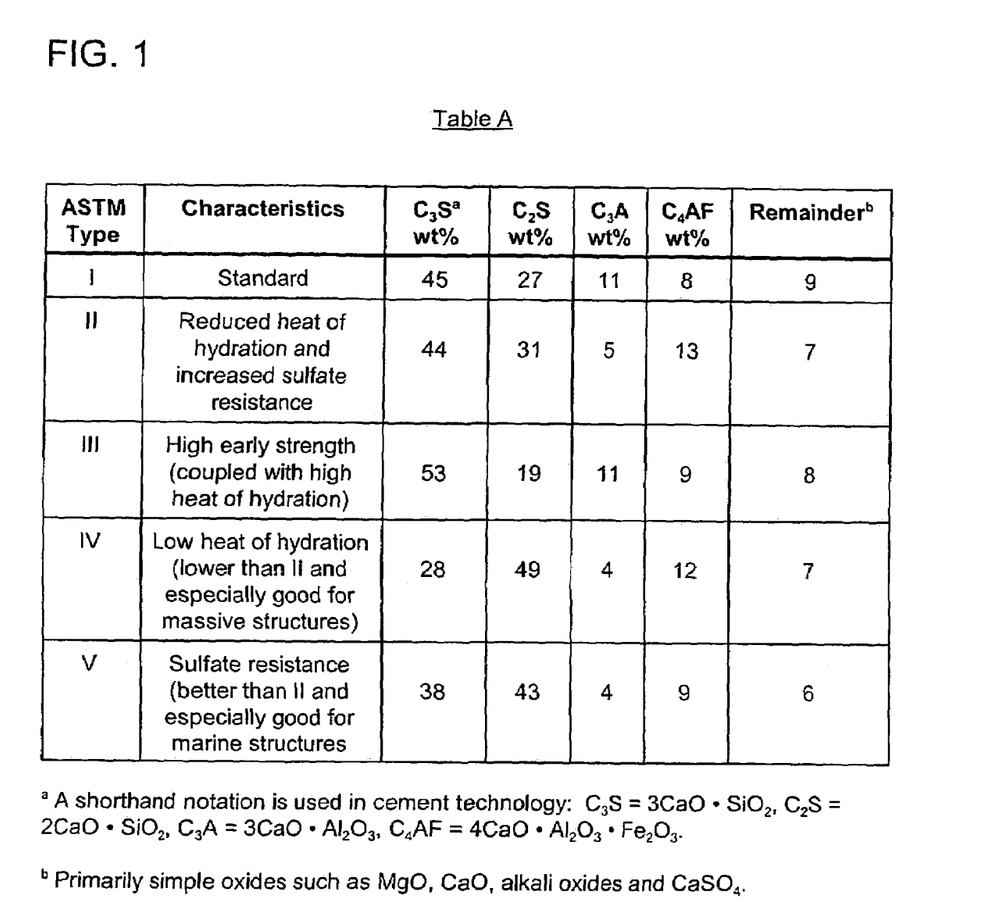
FIG. 1 contains a table of common types of portland cement.

In accordance with the present invention, a cementitious mixture, or an aqueous cementitious mixture, comprises cement and water. The cement comprises a calcium silicate, a calcium aluminosilicate, a calcium aluminate, a calcium aluminoferrite or mixtures thereof such as portland cements. Five common types of portland cement are set forth in FIG. 1, Table A which indicates the relative concentrations of the four typical calcium-containing minerals used to make cement.

B. Water

The amount of water added to the cement depends largely on desired flow, working consistency and desired material properties of the hardened cementitious mixture. For example, the working state of the cementitious mixture should, depending on the method of application, be adequate for pouring, pumping, spreading, layering, or spraying to form the desired structural, protective or decorative element prior to hardening. The weight ratio of water to cement is typically about 1:3 to about 3:5, and preferably about 1:2. The rate at which cement hydrates varies with the cement particle size, specifically, larger cement particles require a greater amount of time to completely hydrate.

C. Typical Admixtures

Figure 2:
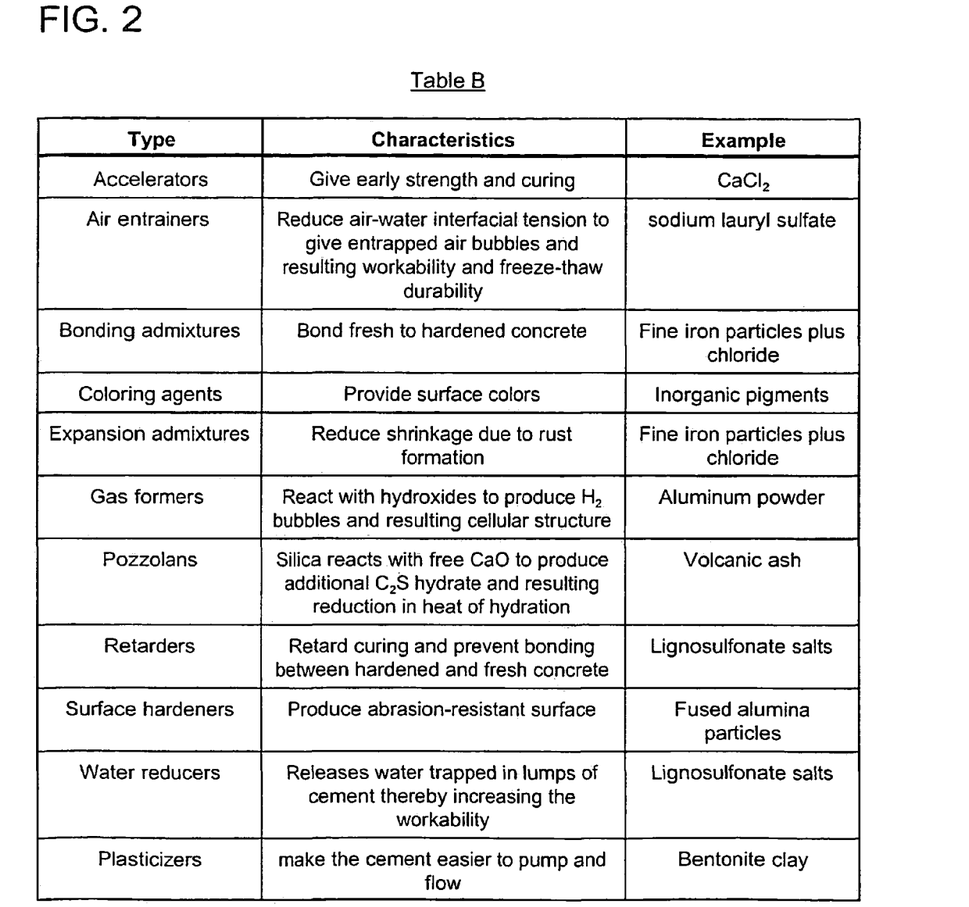
FIG. 2 contains a table of admixtures for portland cement.

In cement technology, there are a number of "admixtures" which are added to provide certain characteristics to the cementitious mixture. Any component of concrete other than aggregate, cement, or water is, by definition, an admixture. A brief list of exemplary admixtures is in FIG. 2, Table B.

Virtually all structural concrete contains some entrapped air. Air entraining admixtures (see supra, e.g., sodium lauryl sulfate) increase the concentration of entrapped air bubbles, usually for the purpose of workability (during forming) and increased resistance to freeze-thaw cycles.

D. Polyelectrolyte Admixtures

The polyelectrolytes of the present invention are water-soluble polymers which comprise a repeat unit that is positively or negatively charged. The polyelectrolytes used in the present invention may be copolymers that have a combination of charged and/or neutral repeat units (e.g., positive and neutral; negative and neutral; positive and negative; or positive, negative and neutral). Preferably, the polyelectrolytes of the present invention are predominantly positively charged or predominantly negatively charged and hereinafter is referred to as a "positively-charged polyelectrolyte" or a "negatively-charged polyelectrolyte," respectively; a polyelectrolyte that is neutral overall may have a tendency to precipitate.

Alternatively, the polyelectrolytes can be described in terms of the average charge per repeat unit in a polymer chain. For example, a copolymer composed of 100 neutral and 300 positively-charged repeat units has an average charge of 0.75 (3 out of 4 units, on average, are positively-charged). As another example, a polymer that has 100 neutral, 100 negatively-charged and 300 positively-charged repeat units would have an average charge of 0.4 (100 negatively-charged units cancel 100 positively-charged units leaving 200 positively-charged units out of a total of 500 units). Thus, a positively-charged polyelectrolyte has an average charge per repeat unit between 0 and 1. An example of a positively-charged copolymer is PDAD-co-PAC (i.e., poly(diallyldimethylammonium chloride) and polyacrylamide copolymer)—the PDAD units have a charge of 1 and the PAC units are neutral so the average charge per repeat unit is less than 1. Similarly, a negatively-charged polyelectrolyte has an average charge per repeat unit between 0 and −1.

The charges on a polyelectrolyte may be derived directly from the monomer units or they may be introduced by chemical reactions on a precursor polymer. For example, PDAD is made by polymerizing diallyldimethylammonium chloride, a positively charged water soluble vinyl monomer. PDAD-co-PAC is made by the polymerization of diallyldimethylammonium chloride and acrylamide (a neutral monomer which remains neutral in the polymer). Poly(styrenesulfonic acid) is often made by the sulfonation of neutral polystyrene. Poly(styrenesulfonic acid) can also be made by polymerizing the negatively charged styrene sulfonate monomer. The chemical modification of precursor polymers to produce charged polymers may be incomplete and result in an average charge per repeat unit that is less than 1.0. For example, if only about 80% of the styrene repeat units of polystyrene are sulfonated, the resulting poly(stryrenesulfonic acid) has an average charge per repeat unit of about −0.8.

As stated above, the method of the present invention comprises mixing a polyelectrolyte comprising a negatively-charged repeat unit (preferably a negatively-charged polyelectrolyte) with the aqueous cementitious mixture. Examples of a polyelectrolyte comprising a negatively-charged repeat unit include polyelectrolytes comprising a sulfonate group ($-SO_3^-$), such as poly(styrenesulfonic acid)("PSS"), poly(2-acrylamido-2-methyl-1-propane sulfonic acid)("PAMPS"), sulfonated lignin, poly(ethylenesulfonic acid), poly(methacryloxyethylsulfonic acid), their salts, and copolymers thereof; and sulfates such as carragenin.

The method of the present invention also comprises mixing a polyelectrolyte comprising a positively-charged repeat unit (preferably a positively-charged polyelectrolyte) with the aqueous cementitious mixture. Examples of a polyelectrolyte comprising a positively-charged repeat unit include polyelectrolytes comprising a quaternary ammonium group, such as poly(diallyldimethylammonium chloride)("PDAD"), poly(vinylbenzyltrimethylammonium) ("PVBTA"), ionenes, poly(acryloxyethyltrimethyl ammonium chloride), poly(methylene-N,N-dimethylpiperidinium), poly(methacryloxy(2-hydroxy)propyltrimethyl ammonium chloride), and copolymers thereof; and polyelectrolytes comprising a pyridinium group, such as, poly(N-methylvinylpyridine)("PMVP"), other poly(N-alkylvinylpyridines), and copolymers thereof.

The polyelectrolytes used in the method of the present invention have very low toxicity. In fact, poly(diallyldimethylammonium chloride), poly(2-acrylamido-2-methyl-1-propane sulfonic acid) and their copolymers are used in the personal care industry, e.g., in shampoos. Also, because the polyelectrolytes used in the method of the present invention are synthetic or synthetically modified natural polymers, their properties (e.g., charge density, viscosity, water solubility and response to pH) may be finely tailored by adjusting their composition.

Figure 3:
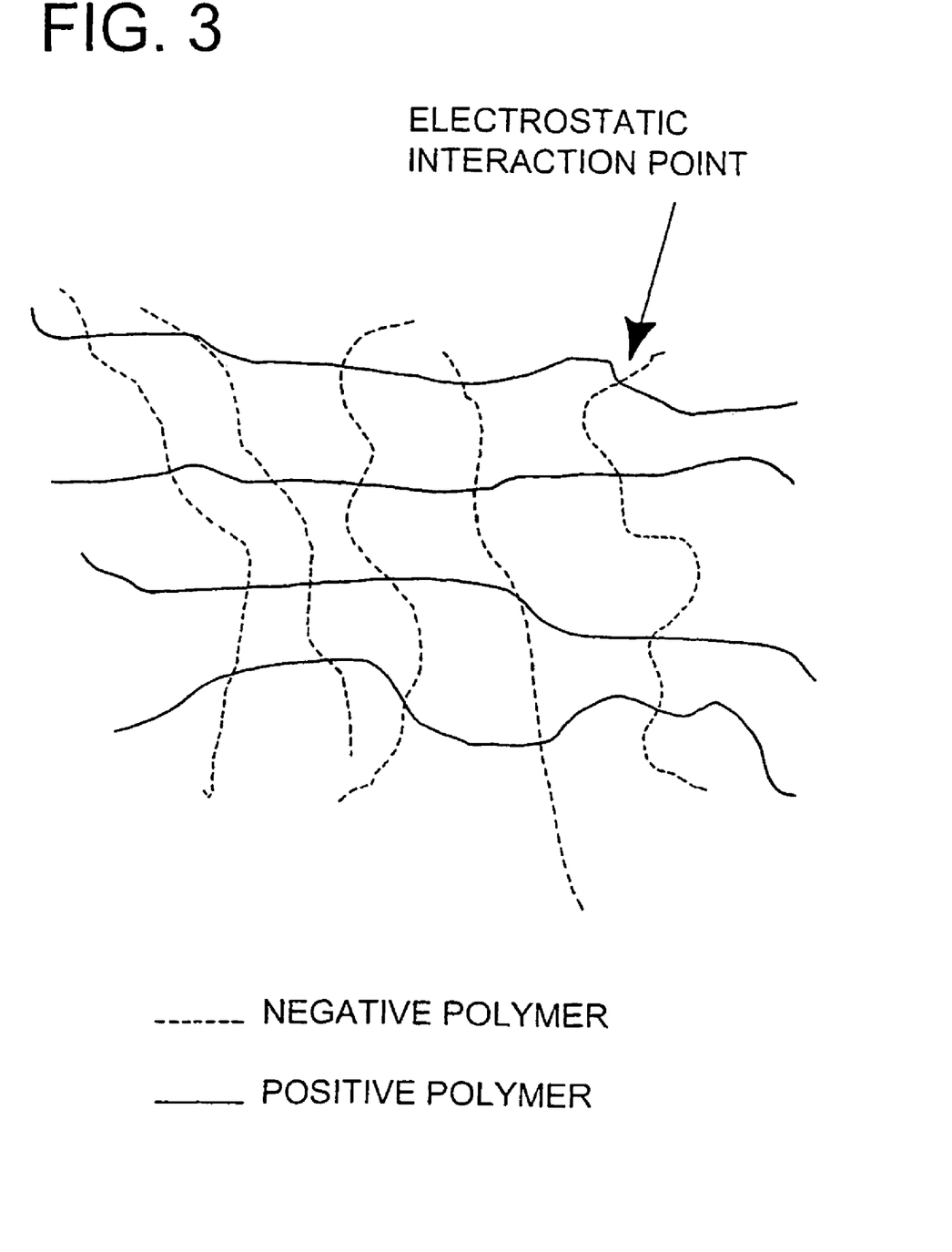
FIG. 3 is a diagram of the proposed structure formed by the electrostatic interaction of negative and positive polymers in a cementitious mixture.

Referring to FIG. 3, without being held to a particular theory, it is presently believed that the oppositely-charged repeat units of the polyelectrolytes, when mixed into the cementitious mixture, associate by electrostatic interaction (i.e., intermolecular electrostatic crosslinking) to form a diffuse network within the cementitious mixture. This diffuse network structure may be similar to a gel in that a relatively large amount of low-viscosity liquid (cementitious mixture) is rendered extremely viscous by the addition of a relatively small amount of polyelectrolyte.

Figure 9:
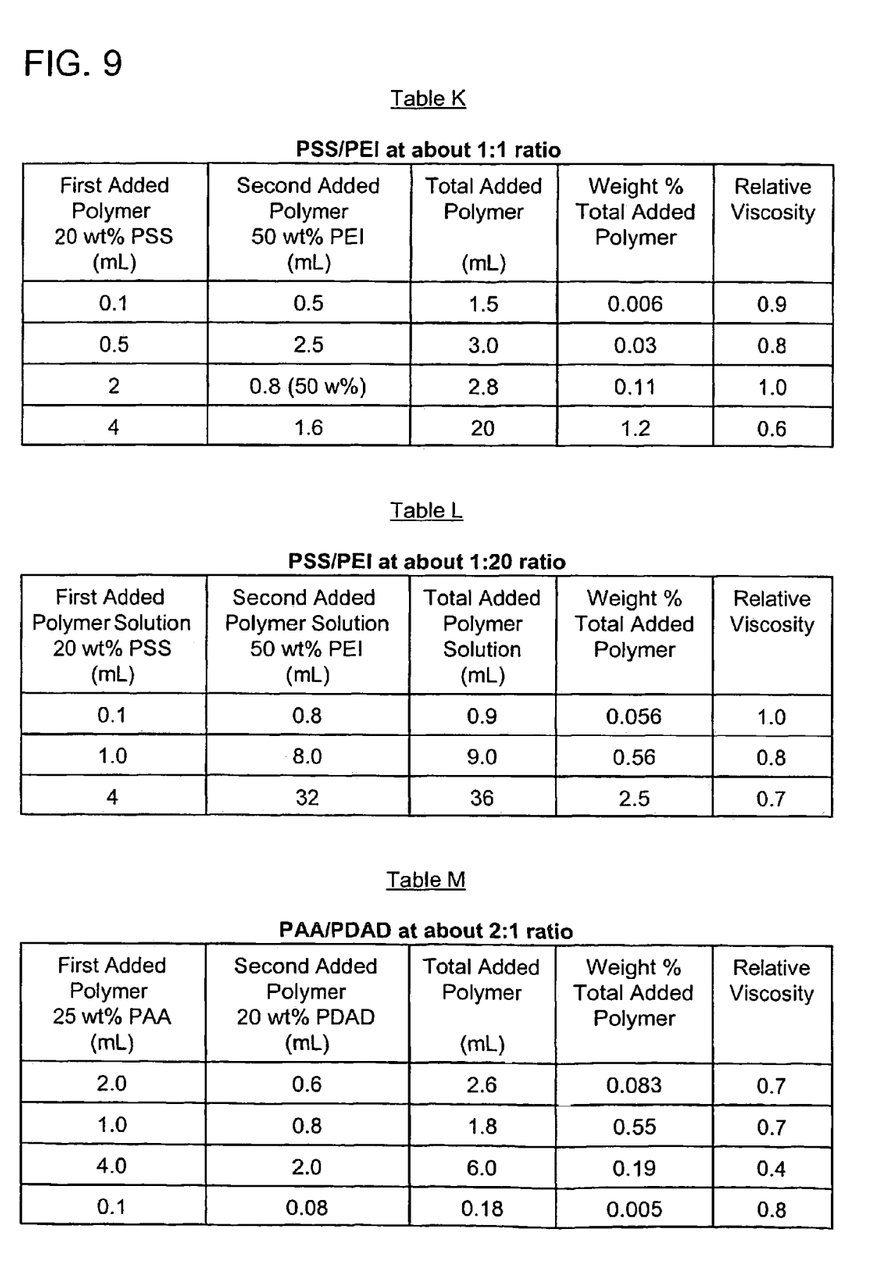
FIG. 9 contains tables of the viscosity as a function of total polyelectrolyte added for the PSS/PEI system at a 1:1 ratio, the PSS/PEI system at a 1:20 ratio and the PAA/PDAD system at a 2:1 ratio.

The degree of viscosity enhancement depends, in part, on the polyelectrolytes mixed into the cementitious mixture. More specifically, the degree of viscosity enhancement is dependant upon the polyelectrolytes' degree of dissociation. Without being held to a particular theory, it is presently believed that weakly dissociating polyelectrolytes are susceptible to protonation/deprotonation in a highly basic hydrated cementitious mixture (presently, a pH of about 11 to about 13). For example, it is believed that the negative charge of poly(acrylic acid), a weakly dissociated acidic polyelectrolyte having a $pK_a$ of about 5, though completely ionized in the cementitious mixture, only weakly interacts with a quaternary ammonium cationic polyelectrolyte. As a result, for example, the viscosity of a cementitious mixture is not increased when poly(diallyldimethylammonium chloride) and poly(acrylic acid) are used (see FIG. 9, Table M, a detailed description of the tables is set forth in Example 1, infra). Similarly, it is presently believed that the positive charge of poly(ethyleneimine)("PEI"), a weakly dissociated basic polyelectrolyte having a $pK_a$ of about 10, is substantially neutral in the cementitious mixture. As a result, for example, the viscosity of a cementitious mixture is not increased when poly(ethyleneimine) and poly(styrenesulfonic acid) are used (see FIG. 10 Tables K and L).

The polyelectrolytes used in accordance with this invention preferably strongly dissociate in water because the electrical charge associated with strongly dissociating polyelectrolytes is generally not affected by the local pH (i.e., the highly basic nature of hydrated cement). As a result, strongly dissociating polyelectrolytes are effective at increasing the viscosity of a cementitious mixture. Typically, strongly dissociating polyelectrolytes comprise the sulfonate monomer group, the quaternary ammonium monomer group, the pyridinium monomer group, the phosphonium monomer group or the sulfate monomer group. Preferred negatively-charged polyelectrolytes include poly(styrenesulfonic acid) ("PSS"), poly(2-acrylamido-2-methyl-1-propane sulfonic acid)("PAMPS"), sulfonated lignin, poly(ethylenesulfonic acid), poly(methacryloxyethylsulfonic acid). Preferred positively-charged polyelectrolytes include poly(diallyldimethylammonium chloride)("PDAD"), poly(vinylbenzyltrimethylammonium)("PVBTA"), ionenes, poly(acryloxyethyltrimethyl ammonium chloride), poly(methacryloxy(2-hydroxy)propyltrimethyl ammonium chloride), poly(N-methylvinylpyridine)("PMVP"), and other poly(N-alkylvinylpyridines).

The degree of viscosity enhancement is also dependent upon the amount of polyelectrolytes mixed into the cementitious mixture. In general, the greater the amount of polyelectrolytes added to the cementitious mixture the greater the increase in the viscosity of the cementitious mixture. The total concentration of polyelectrolytes can be up to about 10 percent by weight of the cementitious mixture. Preferably, the total concentration of polyelectrolytes is less than about 1 percent by weight of the cementitious mixture. More preferably, the total concentration of the charged polyelectrolytes is less than about 0.1 percent by weight of the cementitious mixture. Surprisingly, the oppositely charged polyelectrolytes can effectively treat a cementitious mixture at concentrations as low as, e.g., 0.01 percent by weight.

The degree of viscosity enhancement also depends upon the relative amounts of negatively- and positively-charged repeat units of the polyelectrolytes. Stated another way, because the viscosity is enhanced by the interaction of negative and positive charges the degree of enhancement is limited by whichever charge is less numerous. Although any ratio of negative charge to positive charge may be used, efficient use of polyelectrolyte dictates that the ratio of negative charge to positive charge from the polyelectrolytes introduced into the cementitious mixture is at least about 1:10 to about 10:1, preferably about 1:2 to about 2:1, and most preferably about 1:1.

The degree of viscosity enhancement may also depend upon other admixtures in the cementitious mixture. For example, surface active agents such as sodium lauryl sulfate (also an air entrainer, see FIG. 2, Table B) interact with the polyelectrolytes of the present invention and may modify their rheological properties. The polyelectrolytes may be added to the cementitious mixture in any available physical state; however, the polyelectrolytes are preferably added as aqueous polyelectrolyte solutions. Typically, the concentration of polyelectrolyte in the aqueous polyelectrolyte solution is about 0.1 to about 50 percent by weight and preferably about 1 to about 10 percent by weight. The molecular weight of the polyelectrolytes is typically between about 1,000 and about 2,000,000 grams per mole, and preferably between about 10,000 to about 500,000 grams per mole.

The degree of viscosity enhancement is also dependent upon the amount of work the cementitious mixture is subjected to after addition of the polyelectrolyte comprising a negatively-charged repeat unit and the polyelectrolyte comprising a positively-charged repeat unit. Without being held to a particular theory, it is presently believed that the maximum viscosity increase occurs at the moment both the polyelectrolytes are uniformly dispersed throughout the cementitious mixture. After the maximum viscosity is reached additional working of the cementitious mixture decreases the viscosity—it is believed that continued mixing causes the polymer molecules to associate more extensively and form agglomerated polyelectrolyte complexes thereby breaking down the network. Thus, the degree of viscosity enhancement may depend on several factors such as volume of cementitious mixture, volume of polyelectrolytes and degree of work applied to the cementitious mixture after addition of the polyelectrolytes. See Example 1 infra.

E. Addition of Polyelectrolytes to the Cementitious Mixture

The polyelectrolytes may be added to the cementitious mixture by any method appropriate for the desired application process for the cementitious mixture. For example, bulk mixing of sequentially added polyelectrolytes is a preferred method when pouring, or troweling. Bulk mixing of sequentially-added polyelectrolytes generally entails adding a polyelectrolyte comprising a repeat unit of a particular charge (i.e., a polyelectrolyte comprising a positively-charged or a negatively-charged repeat unit) to the cementitious mixture, and, when the increase in viscosity is desired, the polyelectrolyte comprising a repeat unit of the opposite charge is added with mixing. Almost immediately after the addition of the second polyelectrolyte, a rapid and relatively large increase in viscosity occurs. After reaching the maximum viscosity enhancement, continued working of the cementitious mixture typically results in a decrease of viscosity—eventually to a level about equal to that before the addition of the first polyelectrolyte.

When adding the polyelectrolytes sequentially, the polyelectrolyte that is added first may produce a relatively small increase or decrease in the viscosity of the cementitious mixture. For example, a decrease in viscosity of about 20 percent (normalized to the viscosity of the cementitious mixture before the addition of the first polyelectrolyte) was observed after the addition of about 0.2 mL of 20 weight percent poly(diallydimethylammonium chloride) aqueous solution to a mixture portland cement (500 g) and water (250 g). Thus, if a small viscosity change prior to application is desirable, an appropriate polyelectrolyte is preferably selected for addition first. For example, a small decrease in viscosity (plasticization) is desirable for transporting a premix cement to a work site, or for pumping, pouring and spraying a cementitious mixture more easily, prior to the addition of the second polymer.

Alternatively, when pouring or troweling a cementitious mixture, the polyelectrolytes are mixed into the cementitious mixture simultaneously. More specifically, the polyelectrolytes are added to separate portions of the cementitious mixture and then the portions are mixed during the application operation. For example, when pouring a cementitious mixture the two portions are poured into the mold together and intermingle.

When pumping or spraying a cementitious mixture, the polyelectrolytes are added in a manner to avoid the problems associated with pumping/spraying a viscosity-enhanced cementitious mixture. Stated another way, when pumping or spraying a cementitious mixture, the polyelectrolytes preferably do not come into contact until the spraying operation. In one embodiment, the polyelectrolytes are mixed into the cementitious mixture simultaneously. More specifically, each polyelectrolyte is added to a separate portion of the cementitious mixture and then the portions are mixed during the spraying operation. That is to say, the two portions are mixed while in the spray apparatus, or immediately after exiting the spray apparatus by the intermingling of spray patterns.

More preferably, the polyelectrolytes are added sequentially by mixing the first polyelectrolyte into the cementitious mixture prior to the spraying operation and adding the second polyelectrolyte to the cementitious mixture during the spraying operation. For example, the second polyelectrolyte may be mixed into the cementitious mixture at the spray apparatus by entrainment in the compressed gas of the spray (e.g., via a metering valve). The relatively small volume of additional water carrying the second polyelectrolyte can be neglected or the amount of water added to the cement can be decreased slightly.

The present invention may also be used with the "dry" or Gunite process. In the Gunite process, a free-flowing mixture of cement and aggregate (often only sand) is pumped through a hose by compressed air and the bulk of the water is added at the nozzle. The term "dry" is relative because the sand usually contains adsorbed water. In accordance with the present invention, the first polyelectrolyte is preferably added to the dry mix and the second polyelectrolyte is added with the water at the nozzle. The first polyelectrolyte may be added to the dry mix by any appropriate method, for example, a dry polyelectrolyte powder may be added to the cement/aggregate mixture or a small volume of water carrying the polyelectrolyte may be sprayed into the dry mix without impacting the flow or spray properties (e.g., one gallon of water/polyelectrolyte can easily treat one ton of dry mix).

Spraying a cementitious mixture onto steel beams is widely practiced for fire retardation purposes. Spraying all the steel beams in a building can require a large amount of concrete and can constitute a significant portion of the construction costs. To reduce the amount of polyelectrolyte used and thereby reduce material costs, it may be desirable to create a gradient of viscosity within the applied cementitious mixture. Specifically, initial or deeper layers of concrete may have a higher concentration of viscosity enhancing polyelectrolytes whereas later applied outer layers would have a lower concentration of polyelectrolytes.

The present invention is further illustrated by the following examples which are merely for the purpose of illustration and are not to be regarded as limiting the scope of the invention or manner in which it may be practiced.

EXAMPLE 1

500 g of portland cement and 250 g of water were mixed using a motorized stirrer with a propeller attached to the end. The reactor was a 1 liter polypropylene beaker having a diameter of 13 cm. The electronic controls of the stirrer were such that the voltage applied to the motor (which determines the torque output) was automatically adjusted to maintain the propeller at a constant rpm. Thus, as the viscosity of mixture being stirred increased, the voltage supplied to the motor increased proportionately. The propeller was a 9 cm diameter disk cut into four segments, or blades, each having an angle of attack of about 30 degrees. The rotation of the propeller was about 150 rpm.

Figure 4:
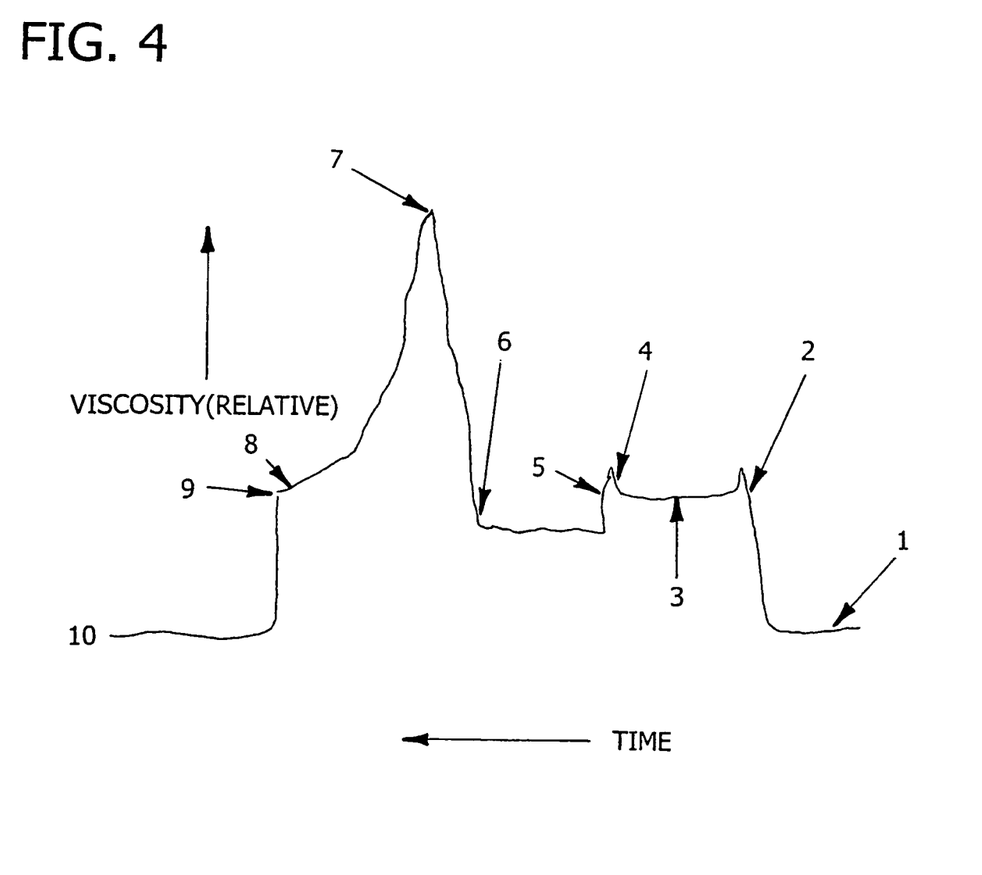
FIG. 4 is a plot of the viscosity as a function of time that indicates when steps in the sequential mixing process were performed.
Figure 5:
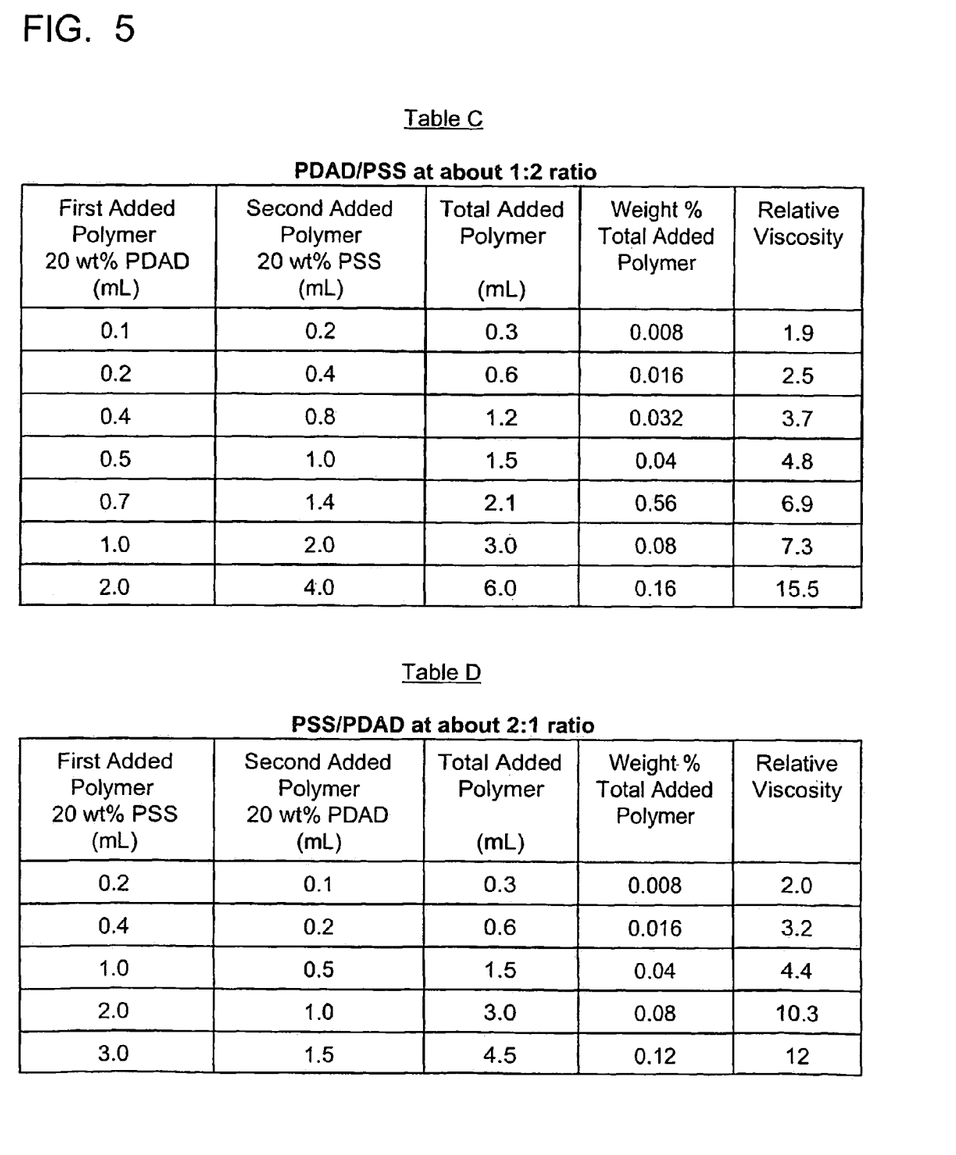
FIG. 5 contains tables of the viscosity as a function of total polyelectrolyte added for the PDAD/PSS system at a 1:2 ratio and the PSS/PDAD system at a 2:1 ratio.
Figure 6:
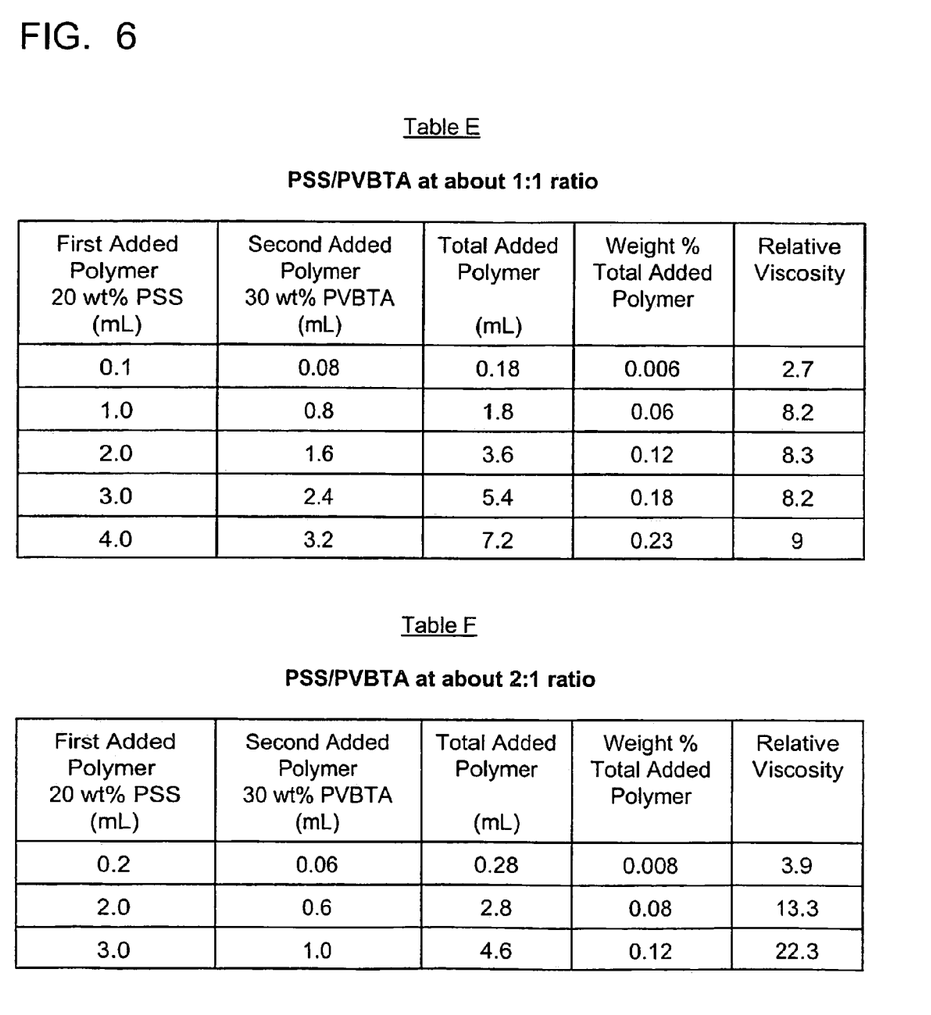
FIG. 6 contains tables of the viscosity as a function of total polyelectrolyte added for the PSS/PVBTA system at a 1:1 ratio and the PSS/PVBTA system at a 2:1 ratio.
Figure 7:
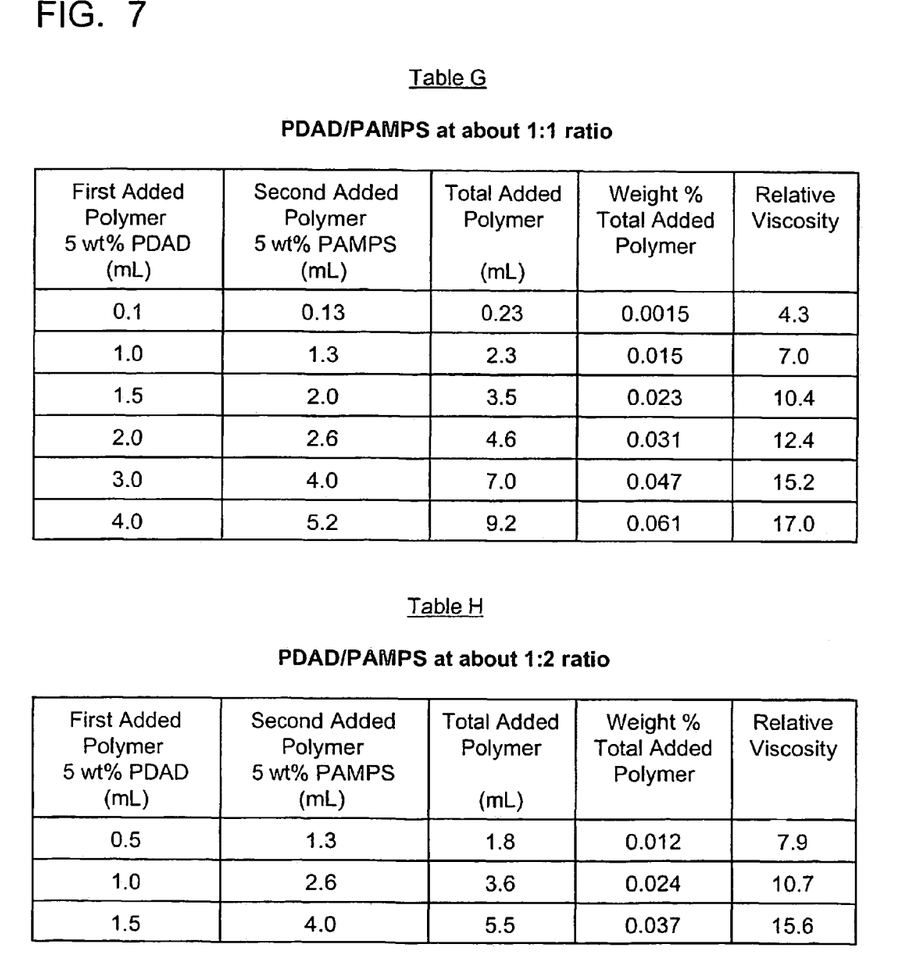
FIG. 7 contains tables of the viscosity as a function of total polyelectrolyte added for the PDAD/PAMPS system at a 1:1 ratio and the PDAD/PAMPS system at a 1:2 ratio.
Figure 8:
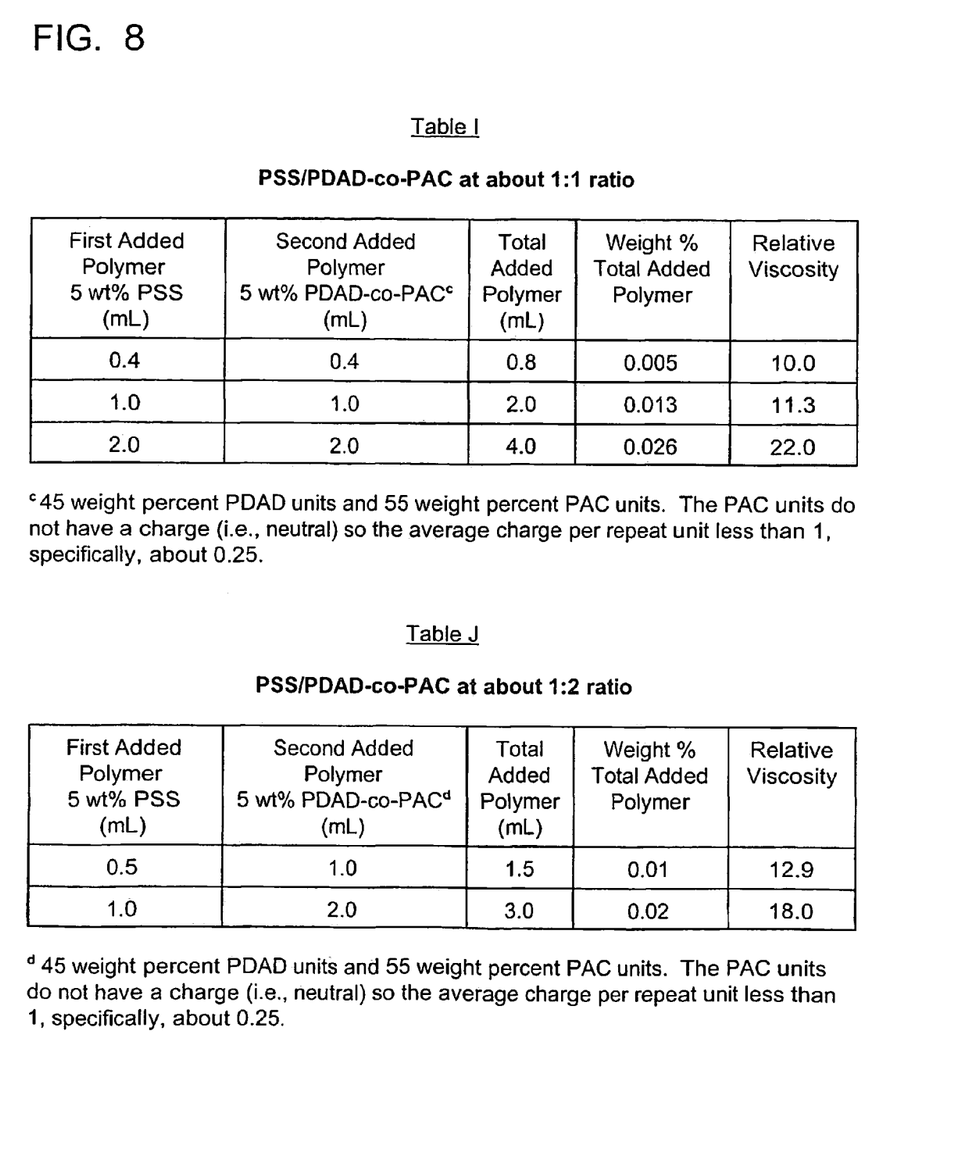
FIG. 8 contains tables of the viscosity as a function of total polyelectrolyte added for the PSS/PDAD-co-PAC system at a 1:1 ratio and the PSS/PDAD-co-PAC system at a 1:2 ratio.

The process of the experiment is depicted in FIG. 4, a plot of the voltage applied to the motor vs. time which is read from right to left. The experiment began with the propeller in the air 1. The propeller was then immersed 2 in the cement and water. The cement and water were thoroughly mixed 3 for about five minutes. At that point in time, a volume of charged polyelectrolyte solution was added 4 to the agitated cementitious mixture. A small decrease in viscosity 5 was observed. After about two minutes, a volume of oppositely charged polyelectrolyte solution was added 6 to the agitated cementitious mixture. The viscosity was observed to increase immediately to a maximum value 7 after about ten seconds. Continued mixing for about two minutes decreased the viscosity 8 to a value about equal to that of the starting portland cement 9 before the propeller was removed from the cement, the signal returning back to the baseline 10 of the unloaded motor in air.

Figure 10:
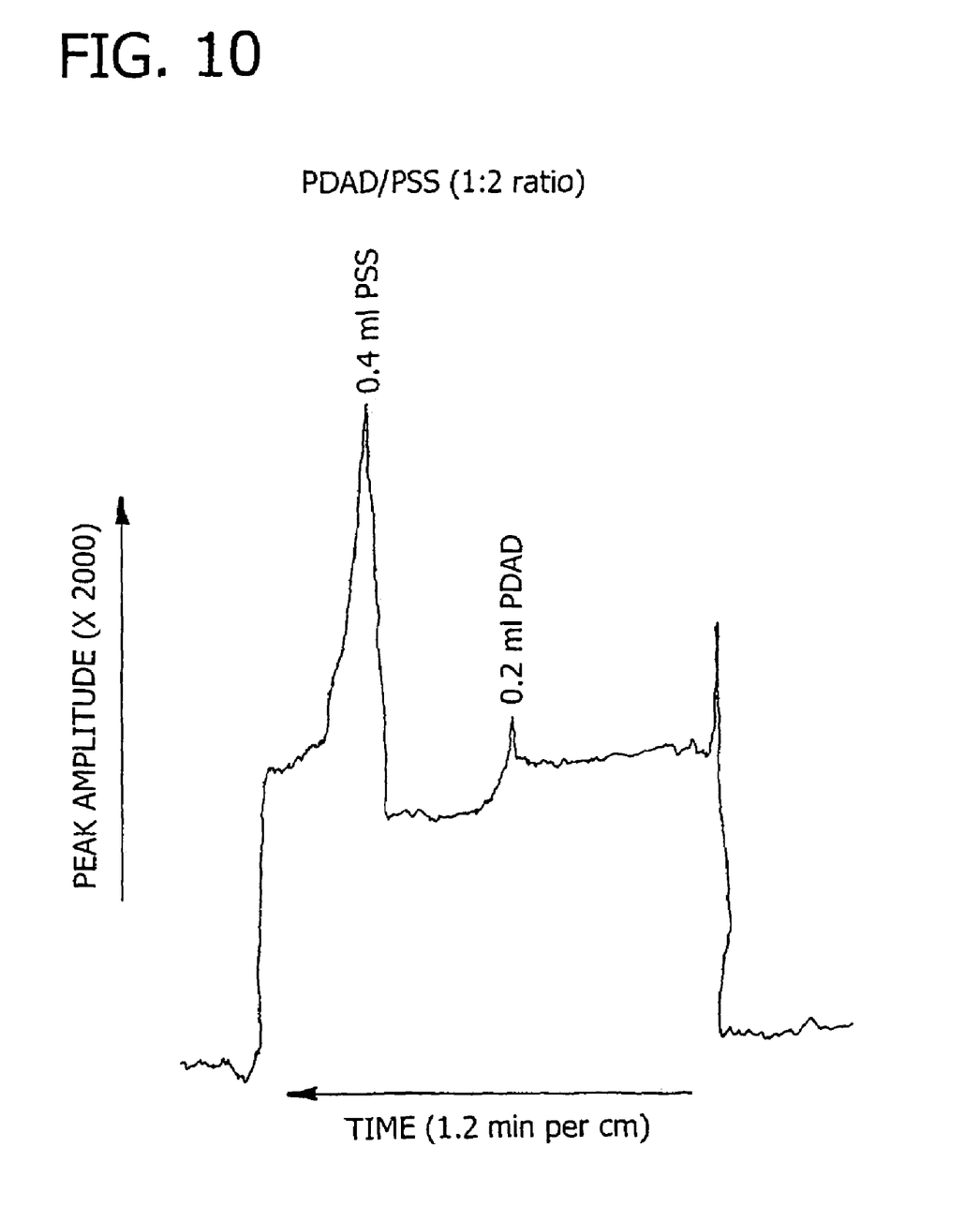
FIG. 10 is a plot of the viscosity as a function of time for the sequential mixing of the PDAD:PSS system at a ratio of 1:2.

The experimental results for specific polyelectrolyte combinations, amounts and concentrations are illustrated in FIGS. 5-9, Tables C-M. As set forth in the tables the change in viscosity is determined relative to the viscosity of the cementitious mixture prior to adding the any polyelectrolyte. For example, a relative viscosity of 1.0 after the addition of both polymers indicates that the viscosity of the cementitious mixture was unchanged, whereas a relative viscosity of 2.0 indicates that the viscosity doubled. Tables C-J in FIGS. 5-8 generally indicate that the viscosity of the cementitious mixture increases with increasing amounts of positive and negative polyelectrolytes. The experiments were performed with 500 g of Portland Cement, 250 g of water and various amounts of the following exemplary polyelectrolytes: PSS (mol. wt. ca. 70,000); PDAD (mol. wt. ca. 300,000); PAMPS (mol. wt. ca. 1-1.5 million), PAA (mol. wt. ca. 100,000); and PEI (mol. wt. ca. 100,000). For example, FIG. 10, depicts an experiment wherein the first polyelectrolyte added to the cementitious mixture was 0.2 mL of 20 weight percent poly(diallydimethylammonium chloride) aqueous solution. A small viscosity decrease was observed (i.e., about 20 percent). After about two minutes, about 0.4 mL of 20 weight percent poly(styrenesulfonic acid) aqueous solution was mixed into the cementitious mixture. The viscosity increased by about 120 percent after about ten seconds of mixing.

The experiments indicate that the method of the present invention can be used to enhance the viscosity of a cementitious mixture with an extraordinarily small amount of polyelectrolyte (e.g., in the PDAD/PSS test depicted in FIG. 10 the total polymer content was only 0.016 percent by weight of the cementitious mixture). Unexpectedly, it was discovered that relatively minuscule quantities of oppositely charge polyelectrolytes (e.g., about 1 wt %, about 0.01 wt % and even as little as about 0.001 wt %) can produce a large viscosity increase.

EXAMPLE 2

A sample mixture of 500 g of sand, 1000 g of water and 2000 g of portland cement was prepared. A second sample with the same mixture of sand, water and cement was prepared, to which was added 40.5 mL of 2.5 weight percent poly(2-acrylamido-2-methyl-1-propanesulfonic acid)(molecular weight ca. 1.5 million) and 16 mL of 5 weight percent poly(diallyldimethylammonium chloride) (molecular weight ca. 300,000). The total weight of polymer was 1.8 g, or 0.04 weight percent of the cementitious mixture. The mixtures were poured into a cylindrical plastic mold having a diameter of 2 inches and a height of 4 inches. Both samples were allowed to harden in water at room temperature for a period of 9 days. Both samples were then allowed to dry in air for 1 day, were capped with hot sulfur paste to smooth the ends, and were subjected to compression in a hydraulic press. The sample without the polymer failed at 11,000±1000 pounds and the sample with the polymer failed at 10,000±1000 pounds. At this level of accuracy, there is no statistical difference between the compressive strengths of the polymer-free and polymer-containing samples.

The experiment indicates that the method of the present invention can be used to enhance the viscosity of a cementitious mixture without a negative impact on the hardening properties and final mechanical strength of the cementitious material.

EXAMPLE 3

A sample mixture of 500 g of portland cement, 250 mL of water, 3 mL of 5 weight percent poly(diallydimethylammonium chloride) aqueous solution and 6 mL of 5 weight percent poly(styrenesulfonic acid) aqueous solution was mixed using the process set forth in Example 1. Second and third mixtures having the same composition of cement, water and polyelectrolytes plus 5 g of clay or silica, respectively, were also mixed using the same process. The test results indicated that the viscosity enhancement response when including about 5 weight percent clay or silica in the cementitious mixture is similar to the response without such additives.

In view of the above, it will be seen that the several objects of the invention are achieved and other advantageous results attained. It is intended that all matter contained in the above description shall be interpreted as illustrative and not in a limiting sense.

What is claimed is:

1. A process for forming an aqueous cementitious mixture with increased viscosity during its working state, the process comprising forming an aqueous cementitious mixture comprising water, Portland cement, a predominantly negatively-charged polyelectrolyte and a predominantly positively-charged polyelectrolyte, the water and Portland cement being in a weight ratio of about 1:3 to about 3:5, respectively, wherein (i) the water, Portland cement and, optionally, one of the predominantly negatively-charged and predominantly positively-charged polyelectrolytes are mixed to form an initial mixture, and (ii) the viscosity of the initial mixture is increased by adding one or both of the predominantly negatively-charged polyelectrolyte and the predominantly positively-charged polyelectrolyte to the initial mixture to form the aqueous cementitious mixture.

2. The process as set forth in claim 1 wherein the positively-charged repeat unit comprises a quaternary ammonium group.

3. The process as set forth in claim 1 wherein the predominantly positively-charged polyelectrolyte is selected from the group consisting of poly(diallyldimethylammonium chloride), poly(vinylbenzyltrimethylammonium), ionenes, poly(acryloxyethyltrimethyl ammonium chloride), poly(methacryloxy(2-hydroxy)propyltrimethyl ammonium chloride), poly(methylene-N,N-dimethylpiperidinium) and copolymers thereof.

4. The process as set forth in claim 1 wherein the positively-charged repeat unit comprises a pyridinium group.

5. The process as set forth in claim 1 wherein the predominantly positively-charged polyelectrolyte is selected from the group consisting of poly(N-alkylvinylpyridines), and copolymers thereof.

6. The process as set forth in claim 1 wherein the negatively-charged repeat unit comprises a sulfonate group.

7. The process as set forth in claim 6 wherein the predominantly-negatively charged polyelectrolyte is selected from the group consisting of poly(styrenesulfonic acid), poly(2-acrylamido-2-methyl-1-propane sulfonic acid), sulfonated lignin, poly(ethylenesulfonic acid), poly(methacryloxyethylsulfonic acid), their salts, and copolymers thereof, and carragenin.

8. The process as set forth in claim 1 wherein the predominantly negatively-charged polyelectrolyte and the predominantly positively-charged polyelectrolyte have a molecular weight of about 1,000 to about 2,000,000 grams per mole.

9. The process as set forth in claim 1 wherein the total concentration of predominantly positively-charged polyelectrolyte and predominantly negatively-charged polyelectrolyte in the aqueous cementitious mixture is up to about 10 percent by weight of the aqueous cementitious mixture.

10. The process as set forth in claim 1 wherein the negative to positive charge ratio of the aqueous cementitious mixture is about 1:10 to about 10:1.

11. The process as set forth in claim 1 wherein the total concentration of polyelectrolytes is less than about 10 percent by weight of the aqueous cementitious mixture.

12. The process as set forth in claim 1 wherein the total concentration of polyelectrolytes is less than about 1 percent by weight of the aqueous cementitious mixture.

13. The process as set forth in claim 1 wherein the total concentration of the polyelectrolytes is less than about 0.1 percent by weight of the aqueous cementitious mixture.

14. The process as set forth in claim 1 wherein the predominantly negatively-charged polyelectrolyte and the predominantly positively-charged polyelectrolyte are mixed into the aqueous cementitious mixture as aqueous solutions having a concentration of polyelectrolyte that is about 0.1 to about 50 percent by weight.

15. The process as set forth in claim 1 wherein the predominantly negatively-charged polyelectrolyte and the predominantly positively-charged polyelectrolyte are mixed into the cementitious mixture sequentially.

16. The process as set forth in claim 15 wherein the predominantly negatively-charged polyelectrolyte is mixed into the aqueous cementitious mixture before the predominantly positively-charged polyelectrolyte is mixed into the aqueous cementitious mixture.

17. The process as set forth in claim 16 wherein the aqueous cementitious mixture is formed in a compressed gas spraying apparatus, the process comprising:
   a. mixing the predominantly negatively-charged polyelectrolyte with the water and Portland cement to form the initial mixture; and
   b. mixing the predominantly positively-charged polyelectrolyte into the initial mixture in the spraying apparatus to form the aqueous cementitious mixture.

18. The process as set forth in claim 17 wherein the predominantly positively-charged polyelectrolyte is mixed into the initial mixture by entrainment in the compressed gas.

19. The process as set forth in claim 15 wherein the predominantly positively-charged polyelectrolyte is mixed into the cementitious mixture before the predominantly negatively-charged polyelectrolyte is mixed into the cementitious mixture.

20. The process as set forth in claim 19 wherein the aqueous cementitious mixture is formed in a compressed gas spraying apparatus, the process comprising:
   a. mixing the predominantly positively-charged polyelectrolyte with the water and Portland cement to form the initial mixture; and
   b. mixing the predominantly negatively-charged polyelectrolyte into the initial mixture in the spraying apparatus to form the aqueous cementitious mixture.

21. The process as set forth in claim 20 wherein the predominantly negatively-charged polyelectrolyte is mixed into the cementitious mixture by entrainment in the compressed gas.

22. The process as set forth in claim 1 wherein the predominantly negatively-charged polyelectrolyte and the predominantly positively-charged polyelectrolyte are simultaneously mixed into the cementitious mixture.

23. The process as set forth in claim 22 wherein the aqueous cementitious mixture is formed in a compressed gas spraying apparatus, the process comprising:
   a. mixing the predominantly negatively-charged polyelectrolyte into a first portion of the cementitious mixture prior to the spraying operation;
   b. mixing the predominantly positively-charged polyelectrolyte into a second portion of the cementitious mixture prior to the spraying operation; and
   c. mixing the first and second portions of the cementitious mixture during the spraying.

24. An aqueous cementitious mixture comprising:
   a. Portland cement;
   b. water;
   c. a predominantly negatively-charged polyelectrolyte comprising a negatively-charged repeat unit; and
   d. a predominantly positively-charged polyelectrolyte comprising a positively-charged repeat unit;
   wherein the water and Portland cement are present in the aqueous cementitious mixture in a weight ratio of about 1:3 to about 3:5, respectively.

25. The aqueous cementitious mixture as set forth in claim 24 further comprising aggregate.

26. The aqueous cementitious mixture as set forth in claim 24 further comprising silica.

27. The aqueous cementitious mixture as set forth in claim 24 further comprising fly ash.

28. The aqueous cementitious mixture as set forth in claim 24 further comprising a surface active agent.

29. The aqueous cementitious mixture as set forth in claim 24 wherein the positively-charged repeat unit comprises a quaternary ammonium group.

30. The aqueous cementitious mixture as set forth in claim 29 wherein the predominantly positively-charged polyelectrolyte is selected from the group consisting of poly(diallyldimethylammonium chloride), poly(vinylbenzyltrimethylammonium), ionenes, poly(acryloxyethyltrimethyl ammonium chloride), poly(methacryloxy (2-hydroxy)propyltrimethyl ammonium chloride), poly(methylene-N,N-dimethylpiperidinium), and copolymers thereof.

31. The aqueous cementitious mixture as set forth in claim 24 wherein the positively-charged repeat unit comprises a pyridinium group.

32. The aqueous cementitious mixture as set forth in claim 31 wherein the predominantly positively-charged polyelectrolyte is selected from the group consisting of poly(N-alkylvinylpyridines), and copolymers thereof.

33. The aqueous cementitious mixture as set forth in claim 24 wherein the negatively-charged repeat unit comprises a sulfonate group.

34. The aqueous cementitious mixture as set forth in claim 33 wherein the predominantly negatively-charged polyelectrolyte is selected from the group consisting of poly(styrenesulfonic acid), poly(2-acrylamido-2-methyl-1-propane sulfonic acid), sulfonated lignin, poly(ethylenesulfonic acid), poly(methacryloxyethylsulfonic acid), their salts, and copolymers thereof, and carragenin.

35. The aqueous cementitious mixture as set forth in claim 24 wherein the predominantly negatively-charged polyelectrolyte and the predominantly positively-charged polyelectrolyte have a molecular weight of about 1,000 to about 2,000,000 grams per mole.

36. The aqueous cementitious mixture as set forth in claim 24 wherein the total concentration of predominantly positively-charged polyelectrolyte and predominantly negatively-charged polyelectrolyte in the cementitious mixture is up to about 10 percent by weight of the cementitious mixture.

37. The aqueous cementitious mixture as set forth in claim 24 wherein the negative to positive charge ratio of the predominantly negatively-charged polyelectrolyte and the predominantly positively-charged polyelectrolyte in the cementitious mixture is about 1:10 to about 10:1.

38. The process as set forth in claim 5 wherein the predominantly positively-charged polyelectrolyte is selected from the group consisting of poly(N-methylvinylpyridine) and copolymers thereof.

39. The process as set forth in claim 32 wherein the predominantly positively-charged polyelectrolyte is selected from the group consisting of poly(N-methylvinylpyridine) and copolymers thereof.

40. A process for forming an aqueous cementitious mixture with increased viscosity, the process comprising
   mixing a predominantly negatively-charged polyelectrolyte with Portland cement to form a dry mix; and
   combining the dry mix with water and a predominantly positively-charged polyelectrolyte in a compressed gas spraying apparatus to form the aqueous cementitious mixture.

41. A process for forming an aqueous cementitious mixture with increased viscosity, the process comprising
   mixing a predominantly positively-charged polyelectrolyte with Portland cement to form a dry mix; and
   combining the dry mix with water and a predominantly negatively-charged polyelectrolyte in a compressed gas spraying apparatus to form the aqueous cementitious mixture.

* * * * *